US012689730B2

(12) United States Patent
Xu et al.

(10) Patent No.: US 12,689,730 B2
(45) Date of Patent: Jul. 21, 2026

(54) MULTI-QUANTIZER METHOD FOR IMAGE AND VIDEO COMPRESSION

(71) Applicant: Tencent America LLC, Palo Alto, CA (US)

(72) Inventors: Motong Xu, Palo Alto, CA (US);
Roman Chernyak, Palo Alto, CA (US);
Lien-Fei Chen, Palo Alto, CA (US);
Yonguk Yoon, Palo Alto, CA (US);
Biao Wang, Palo Alto, CA (US); Shan Liu, Palo Alto, CA (US); Ziyue Xiang, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 19/047,514

(22) Filed: Feb. 6, 2025

(65) Prior Publication Data

US 2025/0267267 A1     Aug. 21, 2025

Related U.S. Application Data

(60) Provisional application No. 63/554,475, filed on Feb. 16, 2024.

(51) Int. Cl.
*H04N 19/124* (2014.01)
*H04N 19/126* (2014.01)
*H04N 19/18* (2014.01)
*H04N 19/70* (2014.01)

(52) U.S. Cl.
CPC ........... *H04N 19/126* (2014.11); *H04N 19/18* (2014.11); *H04N 19/70* (2014.11)

(58) Field of Classification Search
CPC ...... H04N 19/126; H04N 19/18; H04N 19/70; H04N 19/124
See application file for complete search history.

(56) References Cited

U.S. PATENT DOCUMENTS

2019/0052878 A1     2/2019 Zhao et al.
2020/0007873 A1 *   1/2020 Coban .................. H04N 19/124
2023/0269385 A1 *   8/2023 Henzel ................ H04N 19/159
                                                            375/240.03

OTHER PUBLICATIONS

Tencent America LLC, ISR/WO, PCT/US2025/015144, Apr. 22, 2025, 9 pgs.

* cited by examiner

*Primary Examiner* — Patrick E Demosky
(74) *Attorney, Agent, or Firm* — Morgan, Lewis & Bockius LLP

(57)     ABSTRACT

An example method of video coding includes receiving a video bitstream comprising a plurality of blocks and a plurality of quantized transform coefficients, and determining a quantized level for a quantized transform coefficient of the plurality of quantized transform coefficients. The method also includes selecting a quantizer from a set of three or more quantizers based on the quantized level, and deriving, using the selected quantizer, a dequantized transform coefficient for a first quantized transform coefficient of the plurality of quantized transform coefficients. The method further includes reconstructing a first block using the dequantized transform value.

20 Claims, 10 Drawing Sheets

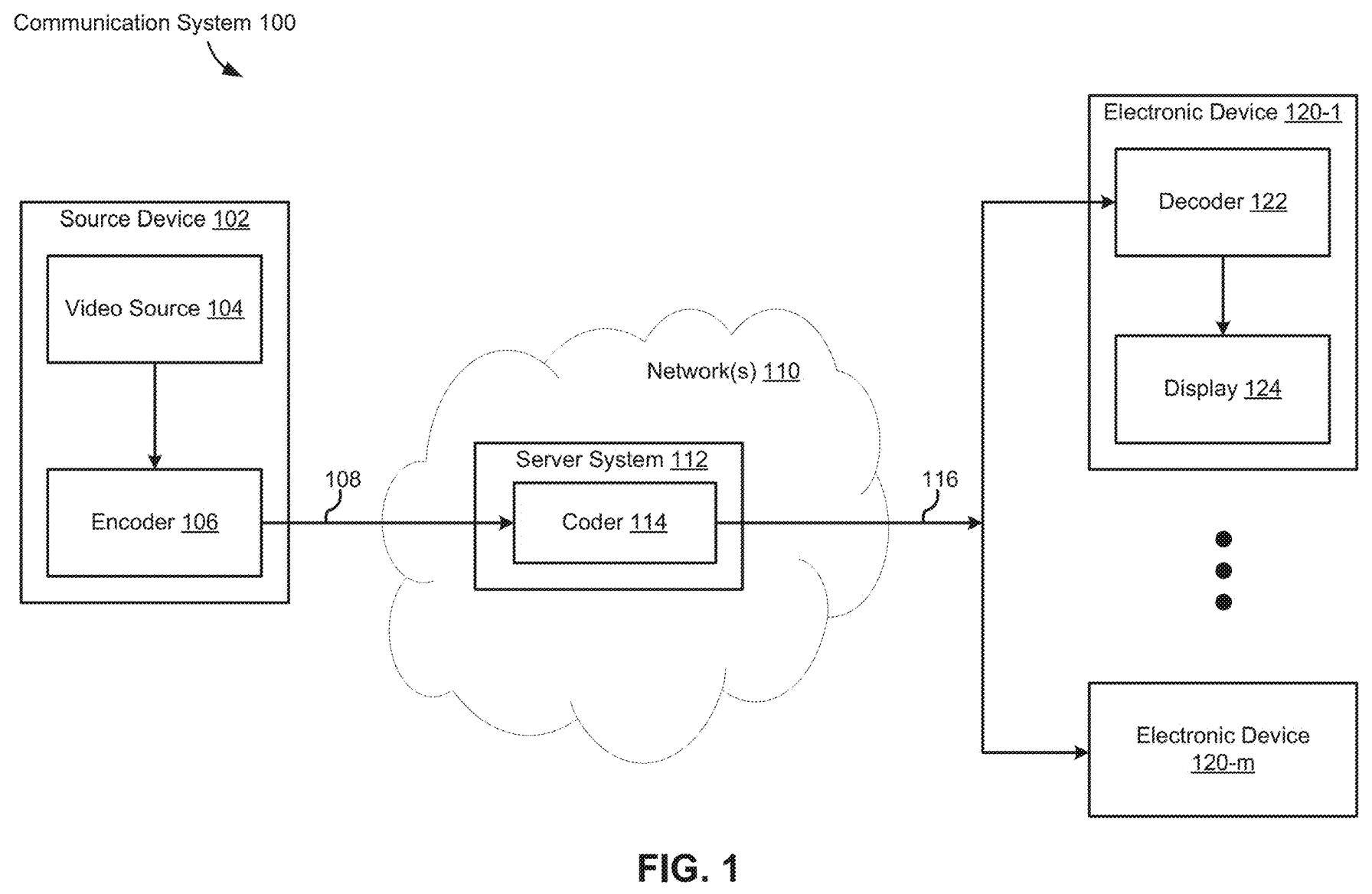

Communication System 100

Electronic Device 120-1

Decoder 122

Display 124

Electronic Device 120-m

Network(s) 110

Server System 112

Coder 114

116

108

Source Device 102

Video Source 104

Encoder 106

FIG. 1

| current state | next state for ... | |
| --- | --- | --- |
| | (k & 1) == 0 | (k & 1) == 1 |
| 0 | 0 | 2 |
| 1 | 2 | 0 |
| 2 | 1 | 3 |
| 3 | 3 | 1 |
| 4 | 4 | 6 |
| 5 | 9 | 11 |
| 6 | 5 | 7 |
| 7 | 10 | 8 |
| 8 | 6 | 4 |
| 9 | 8 | 10 |
| 10 | 7 | 5 |
| 11 | 11 | 9 |

FIG. 4D

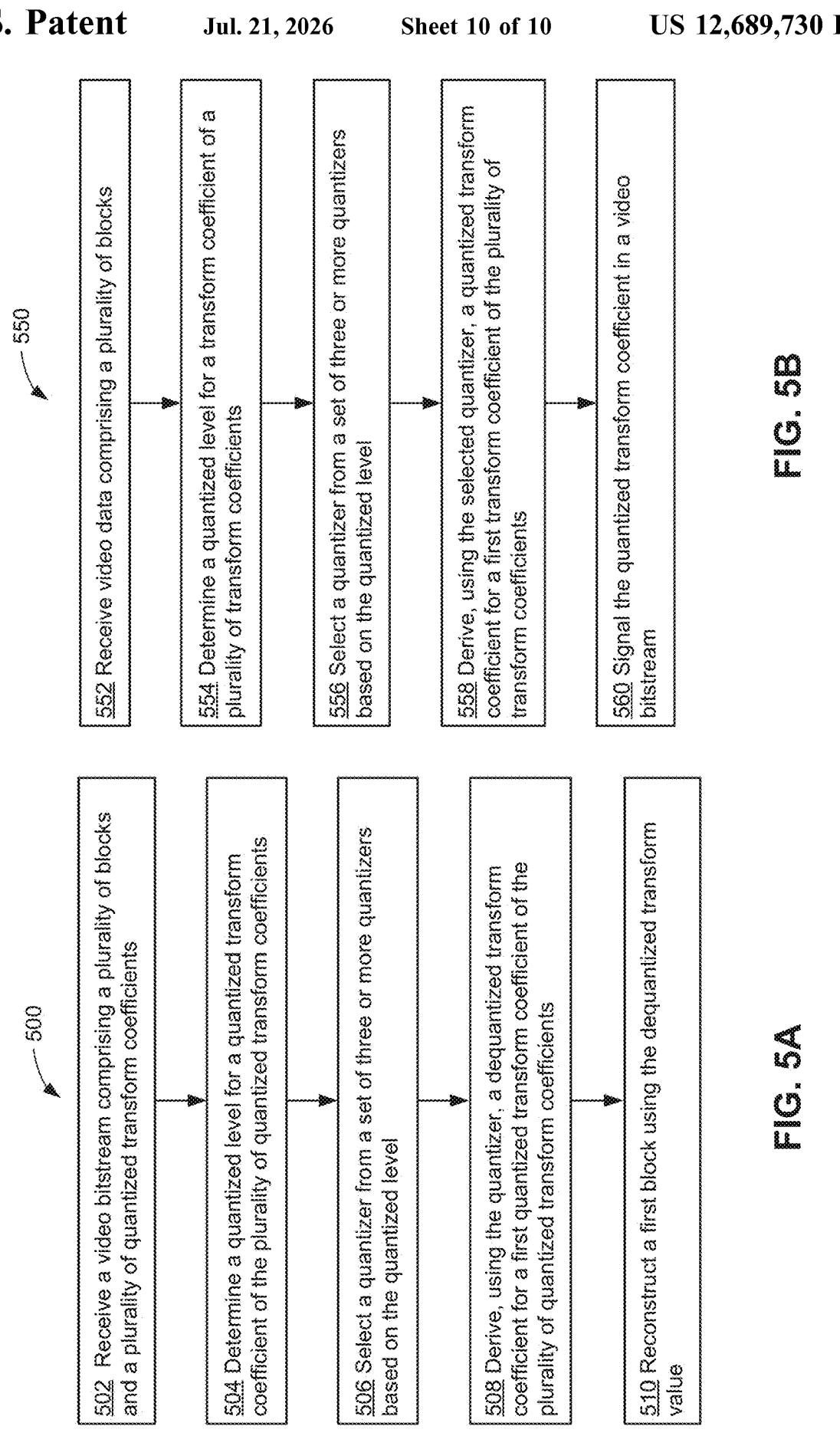

500

502 Receive a video bitstream comprising a plurality of blocks and a plurality of quantized transform coefficients 504 Determine a quantized level for a quantized transform coefficient of the plurality of quantized transform coefficients 506 Select a quantizer from a set of three or more quantizers based on the quantized level 508 Derive, using the quantizer, a dequantized transform coefficient for a first quantized transform coefficient of the plurality of quantized transform coefficients 510 Reconstruct a first block using the dequantized transform value

552 Receive video data comprising a plurality of blocks

554 Determine a quantized level for a transform coefficient of a plurality of transform coefficients 556 Select a quantizer from a set of three or more quantizers based on the quantized level 558 Derive, using the selected quantizer, a quantized transform coefficient for a first transform coefficient of the plurality of transform coefficients 560 Signal the quantized transform coefficient in a video bitstream

FIG. 5B

MULTI-QUANTIZER METHOD FOR IMAGE AND VIDEO COMPRESSION

RELATED APPLICATIONS

This application claims priority to U.S. Provisional Patent Application No. 63/554,475, entitled "Multi-Quantizer Method for Image and Video Compression," filed Feb. 16, 2024, which is hereby incorporated by reference in its entirety.

TECHNICAL FIELD

The disclosed embodiments relate generally to video coding, including but not limited to systems and methods for quantization/de-quantization of coefficients.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released. Enhanced Compression Model (ECM) is a video coding standard that is currently under development. ECM aims to significantly improve compression efficiency beyond existing standards like HEVC/H.265 and VVC, essentially allowing for higher quality video at lower bitrates. ECM version 13 was published on Jul. 7, 2024 in MPEG 146.

SUMMARY

The present disclosure describes, amongst other things, dependent scalar quantization. Dependent scalar quantization is a technique in which a set of reconstruction values for transform coefficients depend on the values of the transform coefficient levels that precede the current transform coefficient level in the reconstruction order. Because quantization indices should be integers, an original reconstructed coefficient may be calculated, and a shifted reconstructed coefficient may be calculated by shifting the quantization indices in the opposite direction of zero. Then a weighted sum may be calculated as the reconstructed coefficient. The present disclosure describes utilizing multiple quantizers during a quantization process. For example, for an N-quantizer quantization process (e.g., N being equal to 3, 4, 6, 8, or other value), given a received quantized level k, its reconstruction value t' may be calculated by one of the N different quantizers. Which quantizer to use may be determined according to some predefined criteria based on available coded information and/or information signaled in the bitstream. An advantage of having more quantizers (e.g., selecting from between 3 or more quantizers) is improved coding accuracy (e.g., due to selecting the most appropriate quantization value). The switching between different quantizers may be implemented based on an M-state machine. The state transition directions of the M-state machine may be based on available coded information and/or information signaled in the bitstream. An advantage of using a state machine to select between quantizers (e.g., using a quantized level and a number of branches) is improved coding accuracy as well as reduced signaling requirements (as compared to signaling each quantizer use) or reduced processing (as compared to calculating the quantizer without using a state machine). Each state transition branch may be mapped to a particular quantizer. An advantage of assigning a quantizer to each state transition branch according to its reconstruction result is improved coding accuracy (e.g., using the optimal quantizer).

In accordance with some embodiments, a method of video decoding includes: (i) receiving a video bitstream (e.g., a coded video sequence) comprising a plurality of blocks (e.g., corresponding to a set of one or more pictures) and a plurality of quantized transform coefficients; (ii) determining a quantized level for a quantized transform coefficient of the plurality of quantized transform coefficients; (iii) selecting a quantizer from a set of three or more quantizers based on the quantized level; (iv) deriving, using the selected quantizer, a dequantized transform coefficient for a first quantized transform coefficient of the plurality of quantized transform coefficients; and (v) reconstructing a first block using the dequantized transform value.

In accordance with some embodiments, a method of video encoding includes: (i) receiving video data (e.g., a source video sequence) comprising a plurality of blocks (e.g., corresponding to a set of one or more pictures); (ii) determining a quantized level for a transform coefficient of the plurality of transform coefficients; (iii) selecting a quantizer from a set of three or more quantizers based on the quantized level; (iv) deriving, using the selected quantizer, a quantized transform coefficient for a first transform coefficient of the plurality of transform coefficients; and (v) signaling the quantized transform value in a video bitstream.

In accordance with some embodiments, a method of video encoding includes: (i) receiving video data (e.g., a source video sequence) comprising a plurality of blocks (e.g., corresponding to a set of one or more pictures); (ii) assigning each quantizer of a set of three or more quantizers to respective state transition branches of a state machine; (iii) selecting a quantizer from the set of three or more quantizers; (iv) deriving, using the selected quantizer, a quantized transform coefficient for a first transform coefficient of a plurality of transform coefficients; and (v) signaling the quantized transform value in a video bitstream.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder). In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 4A illustrates example scalar quantizers in accordance with some embodiments.

FIGS. 4B-4D illustrate example state transitions for quantizers in accordance with some embodiments.

FIG. 5A illustrates an example video decoding process in accordance with some embodiments.

FIG. 5B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
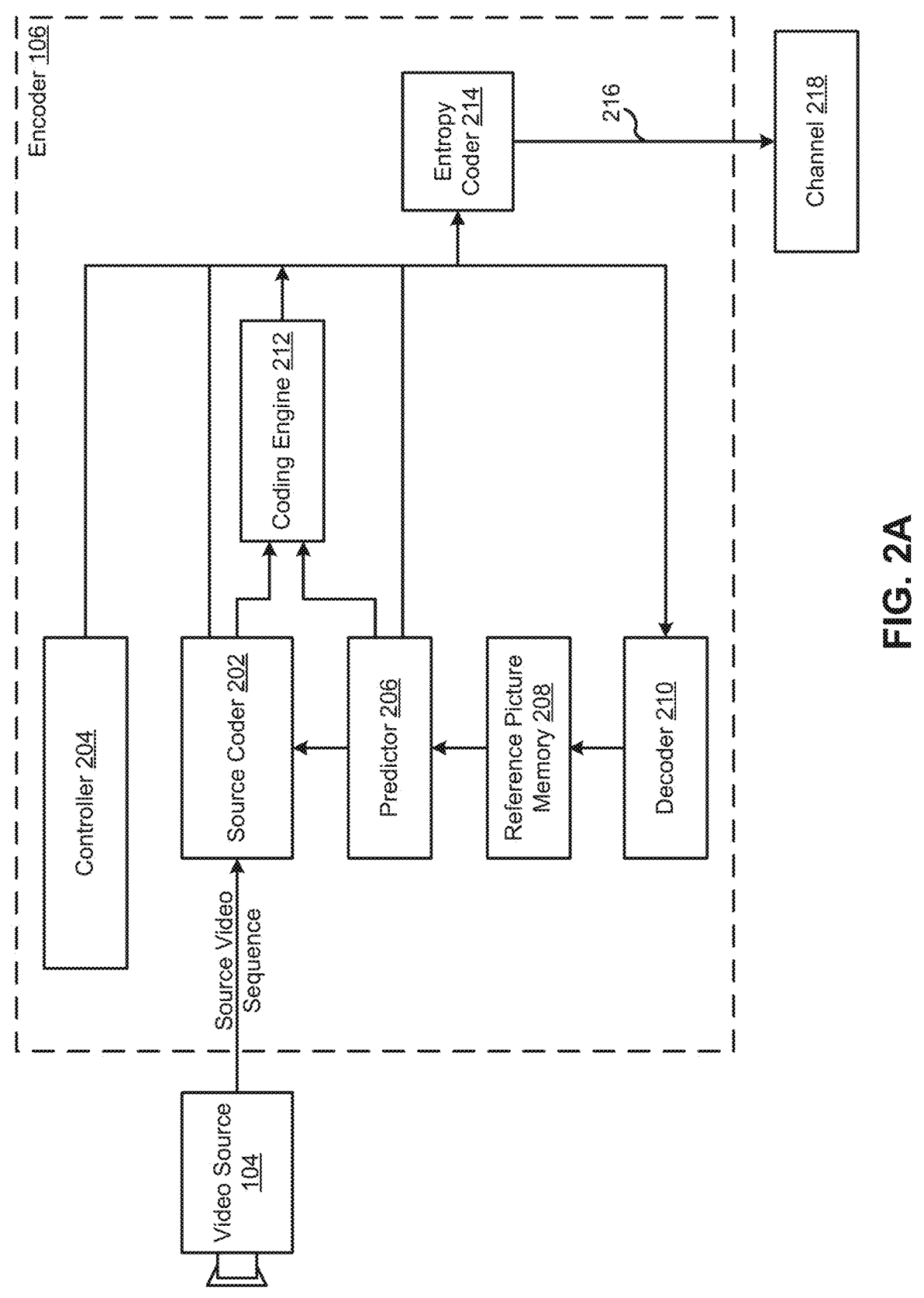
FIG. 2A is a block diagram illustrating example elements of an encoder component in accordance with some embodiments.

The present disclosure describes video/image compression techniques including using scalar quantizers to reconstruct transform coefficients. The scalar quantizers may implement the technique of dependent scalar quantization in which a set of admissible reconstruction values for a transform coefficient depends on the values of the transform coefficient levels that precede the current transform coefficient level in reconstruction order. In some embodiments, a quantized level is determined for a quantized transform coefficient of a plurality of quantized transform coefficients and a quantizer is selected from a set of three or more quantizers based on the quantized level. Using the quantizer, a dequantized transform coefficient is derived for a first quantized transform coefficient of the plurality of quantized transform coefficients. By using three or more quantizers, a more accurate quantized level may be identified and used, which improves the coding accuracy.

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
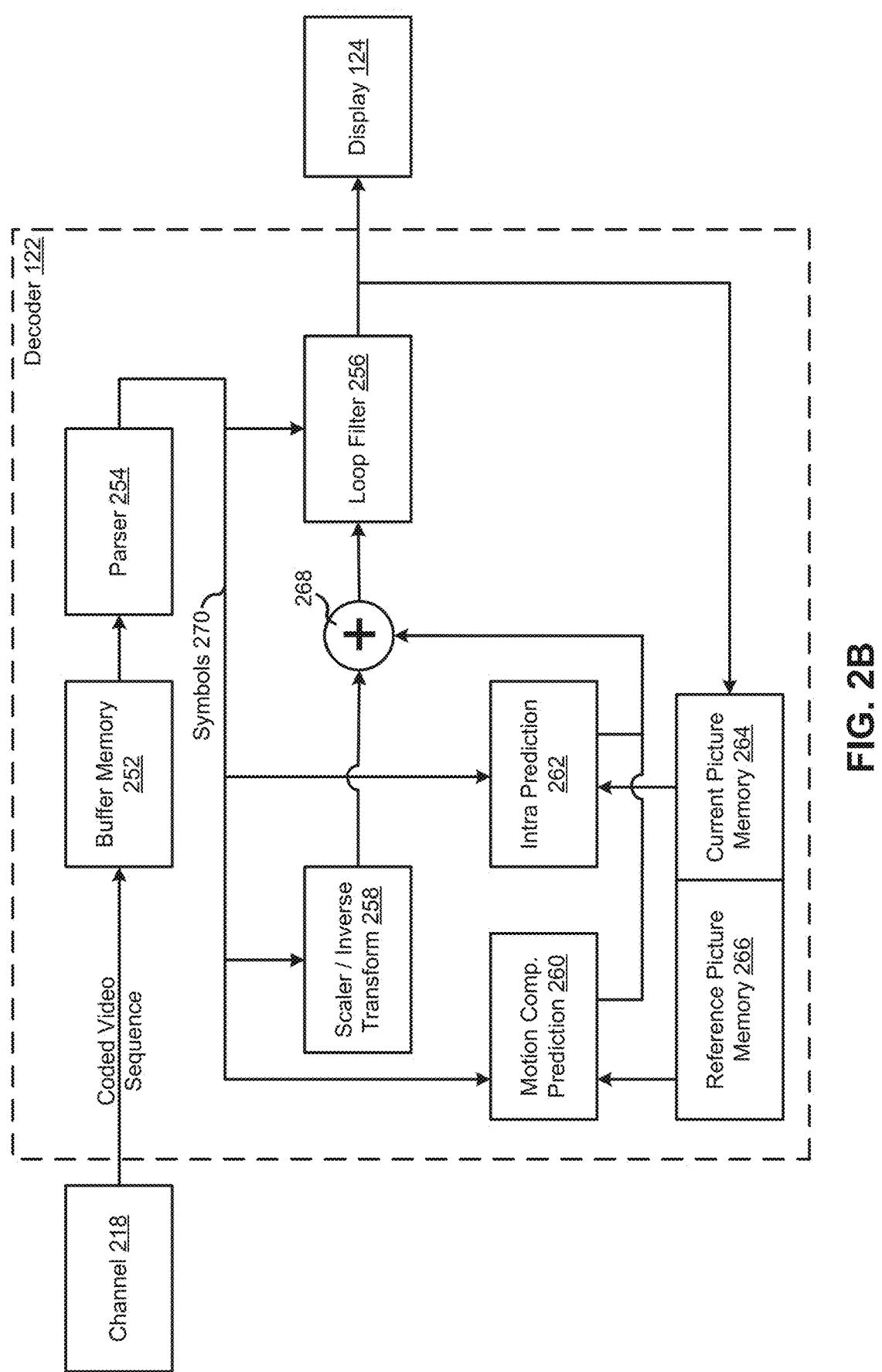
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when sub-sample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
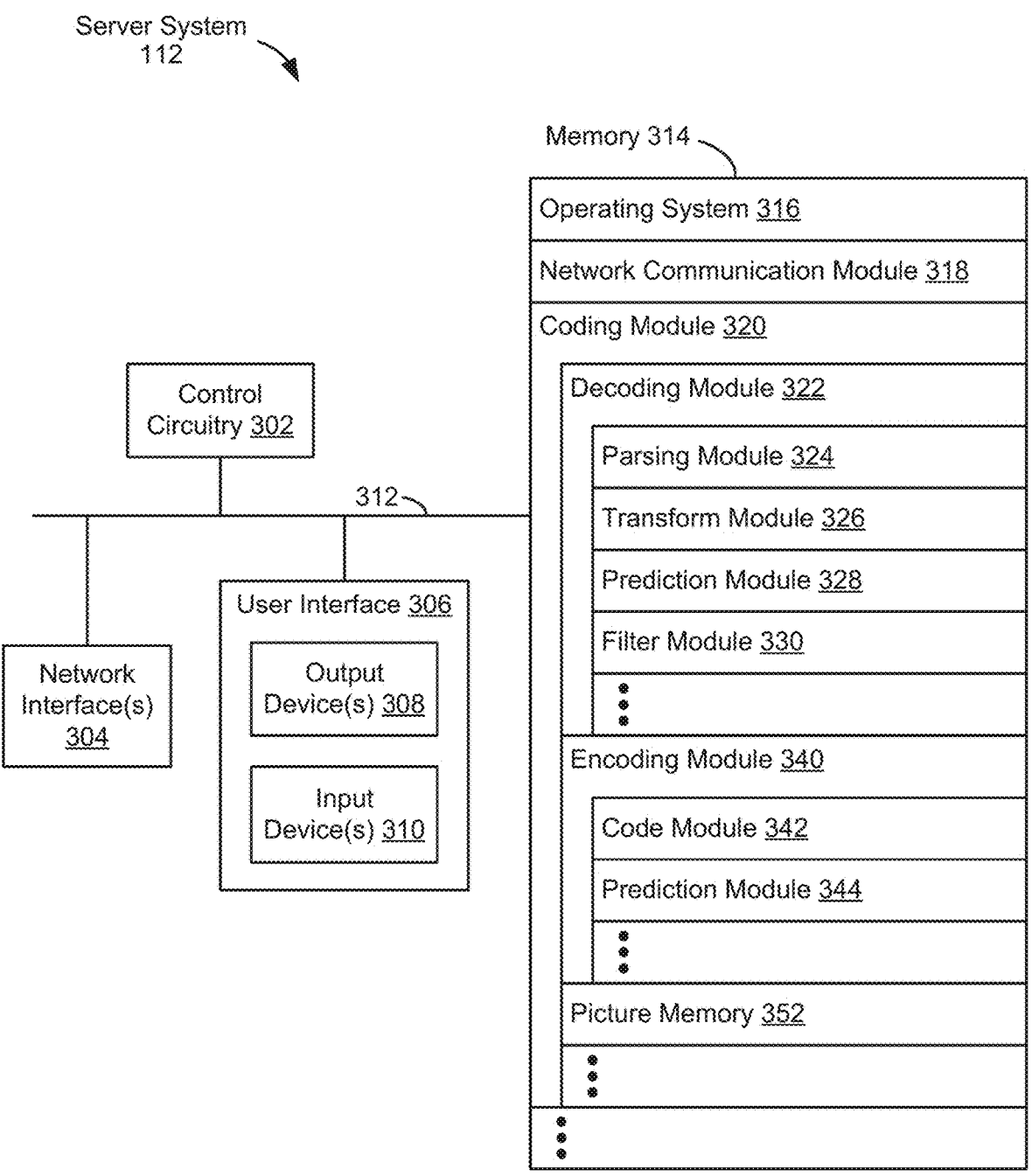
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). As discussed previously, a video codec generally includes several aspects, including partitioning, intra/inter prediction, transform coding, quantization, entropy coding and in-loop filtering. The discussion below relates to quantization aspects.

Figures 4A, 4B, 4C:
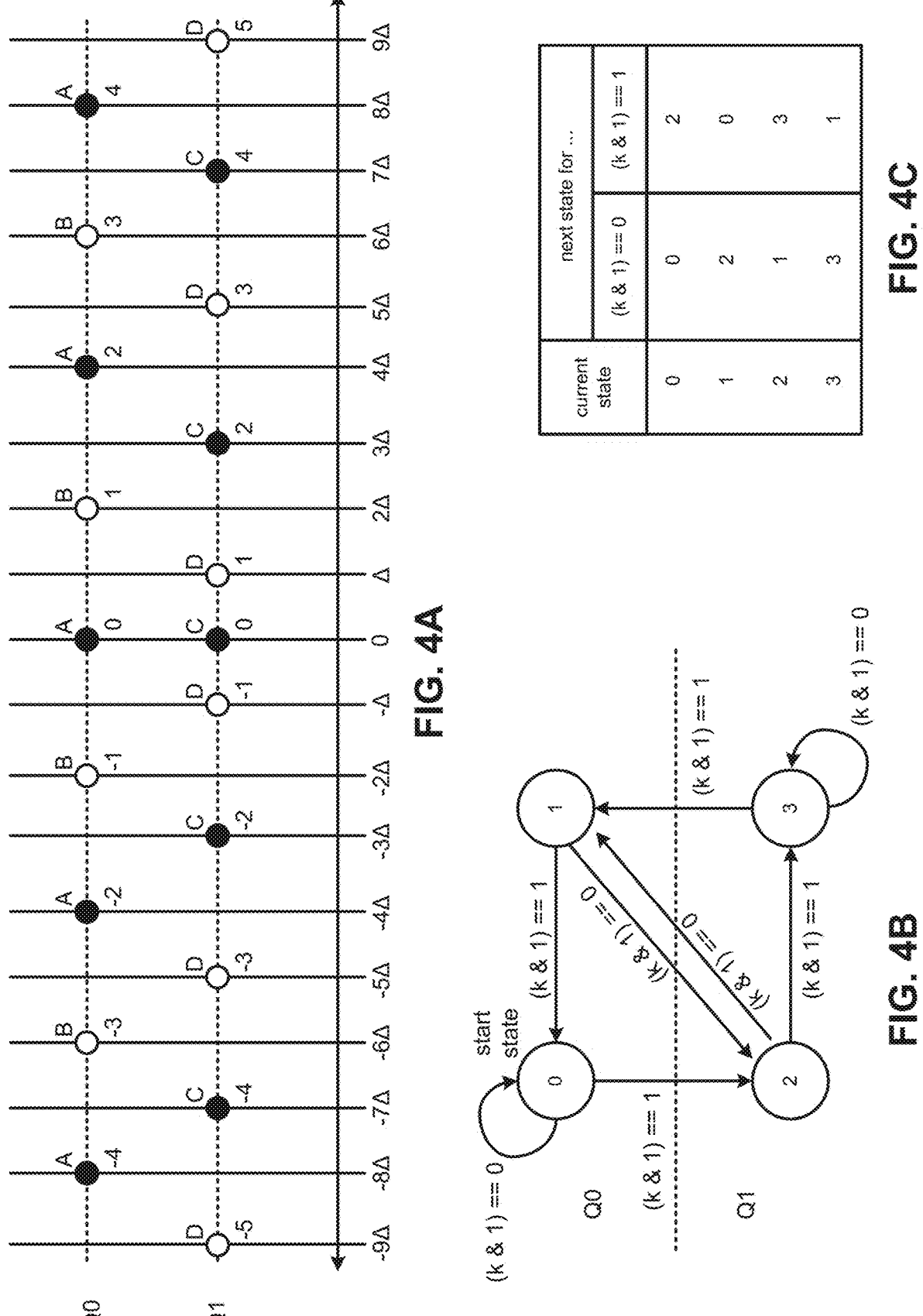

Dependent scalar quantization (also sometimes called Trellis Coded Quantization) refers to an approach in which the set of admissible reconstruction values for a transform coefficient depends on the values of the transform coefficient levels that precede the current transform coefficient level in a reconstruction order. The approach of dependent scalar quantization may be realized by: (a) defining two or more scalar quantizers with different reconstruction levels (e.g., as shown in FIG. 4A) and (b) defining a process for switching between the two or more scalar quantizers (e.g., as shown in FIG. 4B). In some embodiments, whether to use dependent scalar quantization is signaled in the video bitstream. In some embodiments, the dependent scalar quantization is associated with one or more additional contexts.

The reconstruction value of one coefficient may be calculated depending on a quantized coefficient value and a quantizer that is used for reconstruction of the coefficient that precedes the current one in reconstruction order. Switching between the quantizers may be implemented by defining a 4-state transition machine (or a 4-state machine) where the state transition direction at each state depends on the quantized coefficient value. As shown in FIG. 4B, $Q_0$ and $Q_1$ indicate two different quantizers, and k indicates the received quantized coefficient value. In this example, the state transition direction at one state depends on the parity of the quantized coefficient.

FIG. 4A illustrates example scalar quantizers, denoted by $Q_0$ and $Q_1$, in accordance with some embodiments. As illustrated in FIG. 4A, the location of the available reconstruction levels is uniquely specified by a quantization step size $\Delta$. The scalar quantizer used ($Q_0$ or $Q_1$) may not be explicitly signaled in the bitstream. Instead, the quantizer used for a current transform coefficient may be determined by the parities of the transform coefficient levels that precede the current transform coefficient in coding/reconstruction order. In some embodiments, the two quantizers are symmetric quantizers (e.g., a first quantizer that is the same as a scalar quantizer and a second quantizer that is shifted (e.g., shifted a half step) toward zero.

FIGS. 4B-4D illustrate example state (e.g., trellis state) transitions for quantizers in accordance with some embodiments. As illustrated in FIGS. 4B and 4C, the switching between the two scalar quantizers ($Q_0$ and $Q_1$) may be realized via a state machine with four states. In this example, the state may take four different values: 0, 1, 2, 3. As shown in FIG. 4B, the states 0 and 1 may correspond to $Q_0$, and the states 2 and 3 may correspond to $Q_1$. The state is uniquely determined by the parities of the transform coefficient levels preceding the current transform coefficient in coding/reconstruction order.

At the start of the inverse quantization for a transform block, the state may be set equal to 0. The transform coefficients may then be reconstructed in a scanning order (e.g., in the same order they are entropy decoded). In this example, after a current transform coefficient is reconstructed, the state is updated as shown in FIGS. 4B and 4C, where k denotes the value of the transform coefficient level. The state transition table may be expressed as shown in Equation 1 below.

Equation 1-Example State Transition Table $$QStateTransTable[\,][\,] = \{\{0, 2\}, \{2, 0\}, \{1, 3\}, \{3, 1\}\}$$

The mapping of transmitted transform coefficient levels to intermediate quantization indexes (e.g., according to a residual_coding( ) syntax structure) may be derived as shown in Equation 2 below.

Example Transform Coefficient Level Derivation $$TransCoeffLevel[x0][y0][cIdx][xC][yC] = \qquad \text{Equation 2}$$
$$(2*AbsLevel[xC][yC] - (QState > 1\,?\,1\!:\!0))*$$
$$(1 - 2*coeff\_sign\_flag[n])$$

Thus, states {0, 1} use the $Q_0$ quantizer (with even multiplies of step size) and states {2, 3} use the $Q_1$ quantizer (with odd multiplies of step size).

The coding efficiency of trellis-coded quantization may be increased by increasing the number of quantization states (e.g., at the cost of a higher encoder complexity). In some embodiments, the dependent quantization includes 4 quantization states (as illustrated in FIGS. 4B and 4C). In some embodiments, the dependent quantization includes 8 quantization states. In some embodiments, each state is assigned to an entropy model (e.g., a context/CDF). In some embodiments, each quantizer is assigned to an entropy model (e.g., a context/CDF).

FIG. 4D illustrates an example state transition table for supporting both variants of dependent quantization (4 and 8 states) in a unified framework. In FIG. 4D, the dashed line box corresponds to the 4-quantization state variant and the remainder of the table corresponds to the 8-quantization state variant.

The unified state transition table may be expressed as shown in Equation 3 below.

Example Unitifed Transition Table $$QStateTransTable[][] = \{\{0, 1\}, \{2, 3\}, \{1, 0\}, \{3, 2\}, \{4, 6\},$$

Equation 3

$$\{9, 11\}, \{5, 7\}, \{10, 8\}, \{6, 4\}, \{8, 10\}, \{7, 5\}, \{11, 9\}\}$$

In Equation 3, the first 4 states represent the state transition table for dependent quantization with 4 states and the remaining 8 states represent the state transition table for dependent quantization with 8 states. In some embodiments, the initial state for a transform block depends on the selected variant of dependent quantization. The selection may be made using a picture level flag, such as QState in Table 1 below.

Example Quantization State Flag residual_coding( x0, y0, log2TbWidth, log2TbHeight, cIdx ) {   Descriptor

...

QState = ( pic_dep_quant_enabled_idc > 1 ? 4 : 0 )

...

The mapping of transmitted transform coefficient levels to intermediate quantization indexes may be expressed as shown in Equation 4 below.

Equation 4-Example Tranform Coefficient Level Derivation $$TransCoeffLevel[x0][y0][cIdx][xC][yC] =$$

$$(2 * AbsLevel[xC][yC] - (QState \& 1)) * (1 - 2 * coeff\_sign\_flag[n])$$

In this example implementation, states {0, 2, 4, 6, 8, 10} use the $Q_0$ quantizer (with even multiplies of step size) and states {1, 3, 5, 7, 9, 11} use the $Q_1$ quantizer (with odd multiplies of step size).

Some embodiments include a latent-shift algorithm on the end-to-end compression. End-to-end compression models may be considered an unconstrained multiple objective optimization problem where the solution should meet Karush-Kuhn-Tucker (KKT) conditions. According to KKT conditions, the sum of gradient with respect to each objective should be zero. Since there are two objectives (e.g., rate and distortion), the gradient with respect to distortion and the gradient with respect to rate should cancel themselves out (e.g., they show opposite directions). Thus, one can be used instead of the other by simply changing direction. Accordingly, in some embodiments the transform coefficient is shifted away from zero by using the gradient of a simple rate prediction in order to decrease the quantization error.

A simple proxy of rate prediction where each of the quantization indices are independent, and rate increases by absolute value of the coefficient is shown below in Equation 5.

Example Rate Prediction Proxy $$R(y_i) \cong A|y_i| + B$$

Equation 5

Since gradient of rate in Equation 5 is 0 where $y_i = 0$, A where $y_i > 0$ and $-A$ where $y_i < 0$, the applied offset may be defined as shown below in Equation 6.

Example Linear Offsets $$\begin{cases} y_i \leftarrow y_i + \rho^* y_i > 0 \\ y_i \leftarrow y_i - \rho^* y_i < 0, \quad \text{for} \quad i = 1 \dots n \\ y_i \leftarrow y_i y_i = 0 \end{cases}$$

Equation 6

Equation 6 applies some offset to the quantization index that makes them far away from zero point. The amount of the offset $\rho^* \in R^+$ can be finetuned over a validation set and used as a universal value for all videos.

Because quantization indices should be integers, the original reconstructed coefficient is calculated by $Q^{-1}(y_i)$ and reconstructed coefficient when the quantization indices is shifted by 1 quantization index to the opposite direction to zero is calculated as $Q^{-1}(y'_i)$ where $y'_i = y_i + (y_i > 0? 1: -1)$. Then a weighted sum of $Q^{-1}(y_i)$ and $Q^{-1}(y'_i)$ may be used as the reconstructed coefficient as shown in Equation 7 below.

$$\hat{x} = (982 * Q^{-1}(y_i) + 42 * Q^{-1}(y'_i)) >> 10$$

Equation 7—Example Weighted Sum for Reconstructed Coefficient

In some embodiments, the shifting on the reconstruction coefficient is performed only when the quantization index is nonzero. Thus, some embodiments use a weighted sum as described in Equation 7, where $y'_i$ is calculated by shifting $y_i$ (e.g., the signaled quantization index or level) by 1 in the opposite direction of the zero center. However, this does not take into account the current state of the dependent quantizer and thus may be suboptimal. Moreover, Equation 7 does not specify which quantizer (e.g., Q0 or Q1) to use in any given instance. The suboptimality is illustrated by the following two examples on the dependent quantizers shown in FIG. 4A with 4 states, however, a similar example could also be made for dependent quantizer with 8 states.

As an example, assume the signaled transform coefficient level (or quantization index) is 3, and the decoder is currently in state {2}. According to FIGS. 4B and 4C, it can be inferred that the decoder should use the Q1 quantizer to get a reconstructed value of 5Δ. In this example, the state is updated to {3} as per the table in FIG. 4B. The actual value of the transform coefficient may be within a $\pm\Delta/2$ range of $5\Delta$, e.g., with the $+\Delta/2$ range having a higher probability.

If Equation 7 is used, $y_i$ corresponds to quantization index 3 and $Q^{-1}(y_i)$ corresponds to Q1(3), which results in a reconstructed value of $5\Delta$, as indicated by dashed line box 502. The shifted quantization index $y'_i$ (a shift-by-1 operation) corresponds to a quantization index of 4 and $Q^{-1}(y'_i)$ can be either Q1(4) or Q0(4) with reconstructed values $7\Delta$ and $8\Delta$ respectively. Then Equation 7 may be used to derive a final reconstructed value. Using Q1(4) or Q0(4) in Equation 7 is suboptimal because the actual value of the transform coefficient is in the $\pm\Delta/2$ range of $5\Delta$ (with the $+\Delta/2$ range having a higher probability). In this example, using Q0(3) with reconstruction value $6\Delta$ would be more optimal.

As another example, assume the signaled transform coefficient level (or quantization index) is 3, and the decoder is currently in state {1}. According to FIGS. 4B and 4C, it can be inferred that the decoder should use the Q0 quantizer to get a reconstructed value of $6\Delta$. In this example, the state is updated to {0} as per the table in FIG. 4B.

If Equation 7 is used, $y_i$ corresponds to quantization index 3 and $Q^{-1}(y_i)$ corresponds to Q0(3), which results in a reconstructed value of $6\Delta$. The shifted quantization index $y'_i$ corresponds to quantization index 4 and $Q^{-1}(y'_i)$ can be either Q1(4) or Q0(4) with reconstructed values $7\Delta$ and $8\Delta$ respectively. Then Equation 7 may be used to derive a final reconstructed value. Using Q0(4) in Equation 7 is suboptimal because the actual value of the transform coefficient is in the $\pm\Delta/2$ range of 64 (with $+\Delta/2$ range having a higher probability). In this example, using Q1(3) with reconstruction value $7\Delta$ would be more optimal.

In some embodiments, given a received quantized level k with N quantizers $(Q_0, Q_1, \ldots, Q_{N-1})$, its reconstruction value of the n-th quantizer $$t'_n$$

is calculated as shown below in Equation 8.

$$t'_n = Q_n^{-1}(k) \qquad \text{Equation 8}$$

where $$Q_n^{-1}(\cdot)$$

denotes the dequantization function of quantizer $Q_n$, where n can be derived from the existing information at decoder side and/or signaled in the bitstream for each encoded coefficient or a part of the coefficients in a block.

Figure 4E:
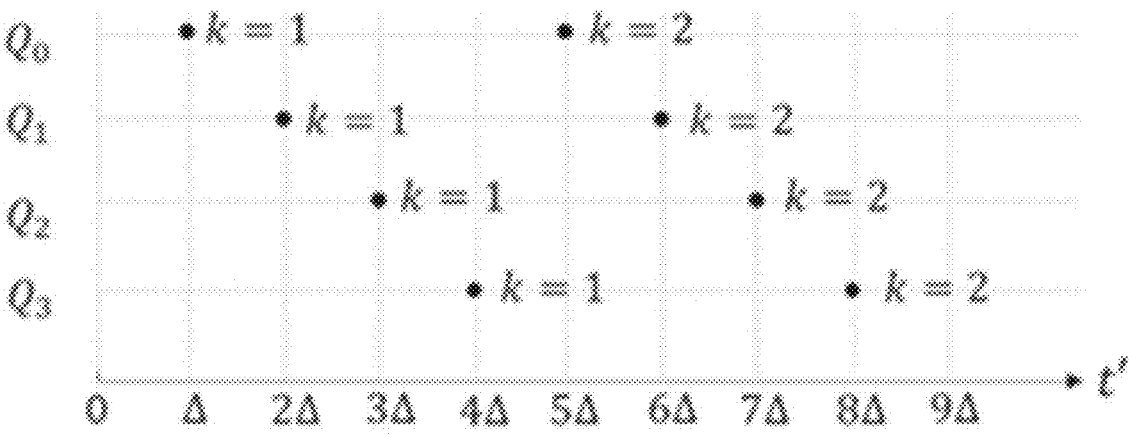
FIG. 4E illustrates example quantization levels in accordance with some embodiments.

FIG. 4E illustrates example quantization levels in accordance with some embodiments. In the example of FIG. 4E, the reconstruction values of k using different quantizers are uniformly distributed. As an example, the reconstruction value of k using a quantizer $Q_n$ is calculated as shown below in Equation 9.

$$t'_n = (x \cdot k + y \cdot n) \cdot \Delta \qquad \text{Equation 9}$$

where x and y are two constant numbers, and $\Delta$ denotes the quantization step size which is shared by all N different quantizers. In a specific example with 4 quantizers, the reconstruction value of k using quantizer $Q_n$ is calculated as shown below in Equation 10.

$$t'_n = (4k - n) \cdot \Delta \qquad \text{Equation 10}$$

An example of the relationship between k, $Q_n$, and t' for the 4-quantizer example is illustrated in FIG. 4E. In some embodiments, the reconstruction values of k using different quantizers are not uniformly distributed. For example, the reconstruction value of k using quantizer $Q_n$ is calculated as shown in Equation 11 below.

$$t'_n = (x_n \cdot k + y_n \cdot n) \cdot \Delta_n \qquad \text{Equation 11}$$

where $x_n$ and $y_n$ are two variables depending on n, and $\Delta_n$ denotes the quantization step size of quantizer $Q_n$.

In some embodiments, the quantizer Q used for reconstruction depends on the current state index (currID). For example, the quantizer Q assigned to quantize the current coefficient may be decided as shown in Equation 12 or 13 below.

$$Q = Q_{currID} \qquad \text{Equation 12}$$

$$Q = Q_{m-1-currID} \qquad \text{Equation 13}$$

In some embodiments, the quantizer Q used for reconstruction depends on the current state index (currID) and the next state index (nextID). In some embodiments, the transition direction to the next state is determined according to k and b, where b is an integer (e.g., a constant). For example, the transition direction to the next state is determined according to the value of k and b as shown in Equation 14 below.

$$nextID = f(k, b) \qquad \text{Equation 14}$$

where $f(\cdot)$ is a function to calculate the nextID from k and b. As an example, the transition direction to the next state is determined according to the value of k mod b as shown in Equation 15 below.

$$nextID = k \% b \qquad \text{Equation 15}$$

where '%' denotes the mod operator. For a 4-state machine with four branches originated from each state, the nextID may be determined as shown in Equation 16 below.

$$nextID = \begin{cases} 0, & |k| \in [r_0, r_1) \\ 1, & |k| \in [r_1, r_2) \\ 2, & |k| \in [r_2, r_3) \\ 3, & \text{otherwise} \end{cases} \qquad \text{Equation 16}$$

where $r_0$, $r_1$, $r_2$, and $r_3$ are the number that determines the ranges.

In some embodiments, the transition direction to the next state is determined according to k, b, and the current state index currID. For example, the function $f(\cdot)$ in Equation 14 may depend on currID so that the transition direction to the next state is determined as shown in Equation 17 below.

$$nextID = f_i(k, b) \qquad \text{Equation 17}$$

where $f_i(\cdot)$ is the function used for currID=i.

Figure 4F:
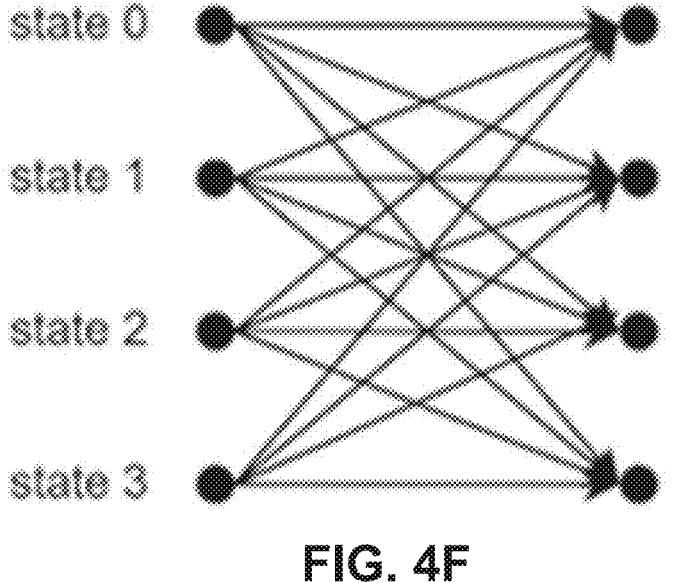
FIGS. 4F and 4G illustrate example quantizer state machines in accordance with some embodiments.
Figure 4G:
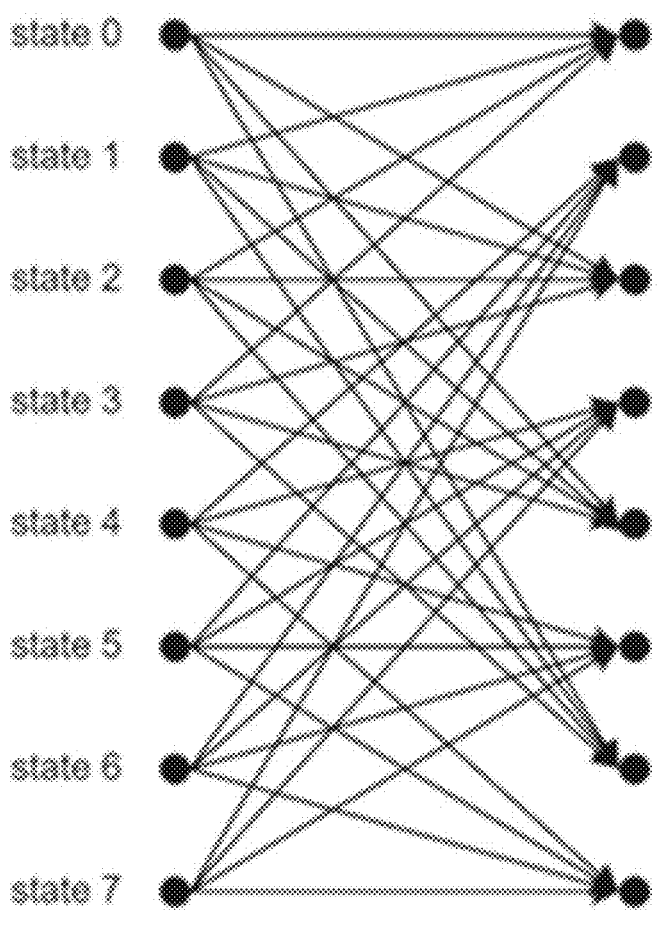

In some embodiments, a lookup table is used to map the nextID from currID and $f(k, x)$. For example, for a 4-state machine with four branches originated from each state as in FIG. 4F. FIGS. 4F and 4G illustrate example quantizer state machines in accordance with some embodiments. The transition direction to the next state nextID may be decided based on the value of k % 4, where '%' denotes the mod operator. One example of the transition direction assignment lookup table is shown in Table 2 below.

TABLE 2

| | nextID | | | |
|---|---|---|---|---|
| currID | k % 4 = 0 | k % 4 = 1 | k % 4 = 2 | k % 4 = 3 |
| 0 | 0 | 1 | 2 | 3 |
| 1 | 1 | 2 | 3 | 0 |
| 2 | 2 | 3 | 0 | 1 |
| 3 | 3 | 0 | 1 | 2 |

As another example, an 8-state machine may be used as in FIG. 4G where there are four branches originated from each state. The transition direction to the next state nextID may be decided based on the value of k % 4 as shown in Table 3 below.

TABLE 3

| | nextID | | | |
|---|---|---|---|---|
| currID | k % 4 = 0 | k % 4 = 1 | k % 4 = 2 | k % 4 = 3 |
| 0 | 0 | 2 | 4 | 6 |
| 1 | 2 | 4 | 6 | 0 |
| 2 | 4 | 6 | 0 | 2 |
| 3 | 6 | 0 | 2 | 4 |
| 4 | 1 | 3 | 5 | 7 |
| 5 | 3 | 5 | 7 | 1 |
| 6 | 5 | 7 | 1 | 3 |
| 7 | 7 | 1 | 3 | 5 |

Figure 4H:
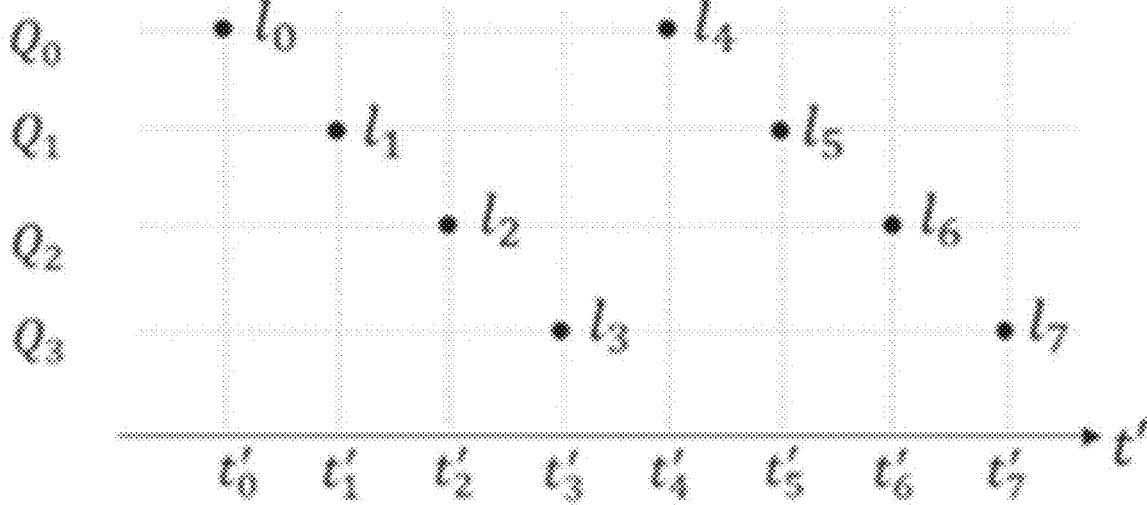
FIG. 4H illustrates example quantization levels in accordance with some embodiments.
Figure 4I:
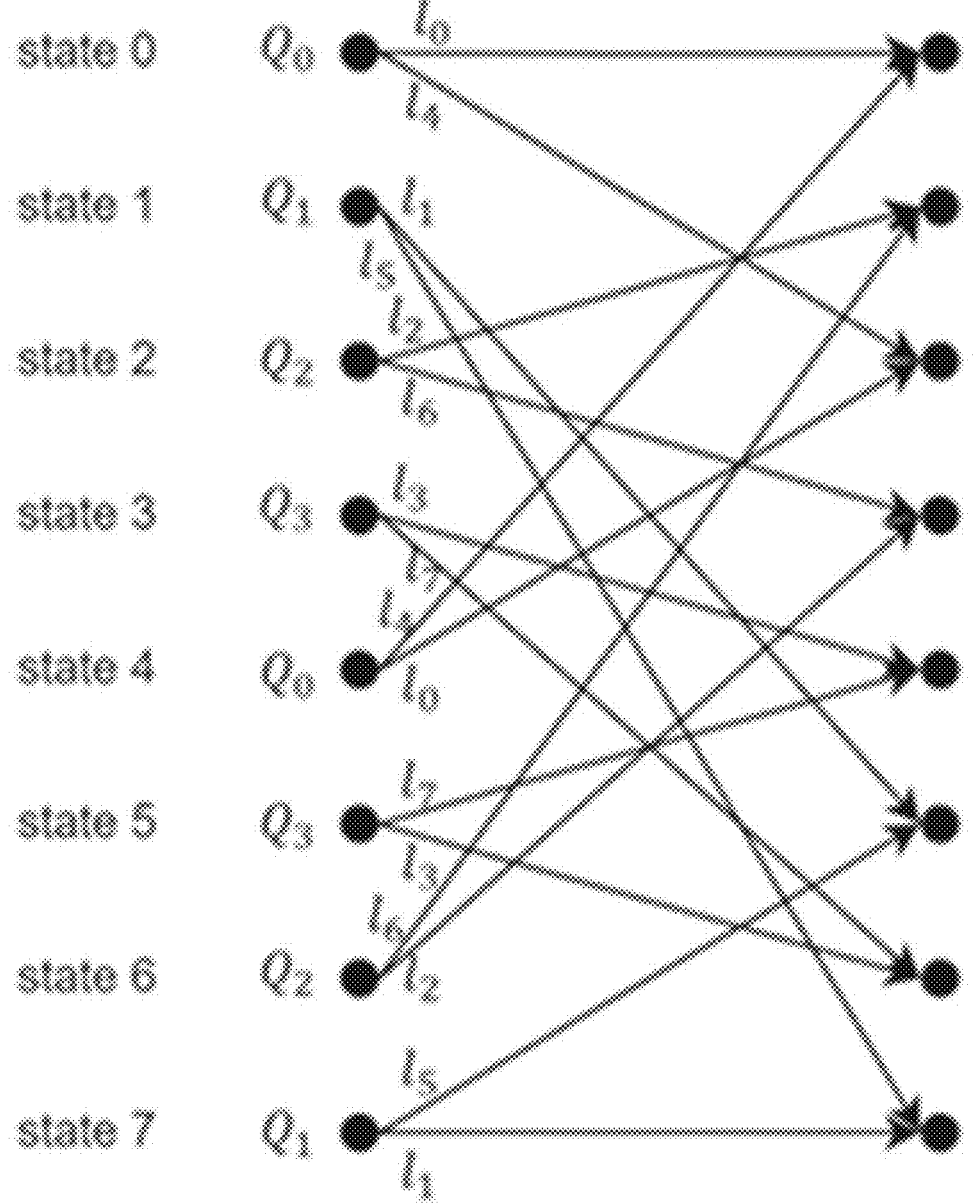
FIG. 4I illustrates another example quantizer state machine in accordance with some embodiments.

FIG. 4H illustrates example quantization levels in accordance with some embodiments. In some embodiments, the quantizer is assigned to each state transition branch according to the distance (e.g., sum of absolute differences) between different possible reconstruction values. In some embodiments, the quantizer is assigned to each state transition branch to ensure the maximum distance (e.g., sum of absolute differences) of the reconstruction values jointing at the same state. As an example, an 8-state machine with two branches jointing at the same state may be implemented. As shown in FIG. 4H, four quantizers $(Q_0, Q_1, Q_2, Q_3)$ are used to generate eight candidates $(l_0, l_1, \ldots, l_7)$ for one coefficient with eight different reconstruction values $$(t'_0, t'_1, \ldots, t'_7),$$

respectively. In this example, to ensure the maximum distance between the reconstruction values jointing at the same state, the candidate pairs at the same state should be $(l_0, l_4)$, $(l_1, l_5)$, $(l_2, l_6)$, $(l_3, l_7)$. One example of the quantizer assignment is illustrated in FIG. 4I.

FIG. 5A is a flow diagram illustrating a method 500 of decoding video in accordance with some embodiments. The method 500 may be performed at a computing system (e.g., the server system 112, the source device 102, or the electronic device 120) having control circuitry and memory storing instructions for execution by the control circuitry. In some embodiments, the method 500 is performed by executing instructions stored in the memory (e.g., the memory 314) of the computing system.

The system receives (502) a video bitstream (e.g., a coded video sequence) comprising a plurality of blocks (e.g., corresponding to a set of pictures) and a plurality of quantized transform coefficients (corresponding to the plurality of blocks). The system determines (504) a quantized level for a quantized transform coefficient of the plurality of quantized transform coefficients. The system selects (506) a quantizer from a set of three or more quantizers (e.g., 4, 6, 8, or other number of quantizers) based on the quantized level. The system derives (508), using the quantizer, a dequantized transform coefficient for a first quantized transform coefficient of the plurality of quantized transform coefficients. The system reconstructs (510) a first block using the dequantized transform value. In this way, a method of utilizing multiple quantizers (e.g., 3 or more quantizers) during quantization process is described. For an N-quantizer quantization process, given a received quantized level k, its reconstruction value t' may be calculated by one of the N different quantizers. The switching between different quantizers can be implemented based on an M-state machine. The rule of quantizer usage, and the state transition directions of the M-state machine may be determined according to some predefined criteria based on information existed at decoder and/or signaled in the bitstream (e.g., in block-level and/or high-level syntax).

In some embodiments, given a received quantized level k with N quantizers $(Q_0, Q_1, \ldots, Q_{N-1})$, its reconstruction value of the n-th quantizer $$t'_n$$

is calculated using Equation 8 above. In some embodiments, the reconstruction values of k using different quantizers are uniformly distributed. For example, the reconstruction value of k using quantizer $Q_n$ is calculated as shown in Equation 9. As a specific example, with a 4-quantizer method, the reconstruction value of k using quantizer $Q_n$ is calculated as shown in Equation 10. An example relationship between k, $Q_n$, and t' for the 4-quantizer method is illustrated in FIG. 4E.

In some embodiments, the reconstruction values of k using different quantizers are not uniformly distributed. For example, the reconstruction value of k using quantizer $Q_n$ is calculated as shown in Equation 11. In various embodiments, x, y, and A from Equation 9 and $x_n$, $y_n$, and $\Delta_n$ from Equation 11 are predefined or signaled in the bitstream (e.g., a block-level or high-level syntax).

In some embodiments, an m-state machine is used for switching between n different quantizers ($Q_0$, $Q_1$, . . . , $Q_{n-1}$). The quantizer used for the reconstruction is decided based on the current status of the m-state machine. For the m-state machine, the transition from the one state to another is determined based on the received quantized level k, the number of branches b originated from the current state, and/or the current state index. In some embodiments, the quantizer Q used for reconstruction depends on the current state index (currID). In some embodiments, the quantizer Q assigned to quantize the current coefficient is decided as shown in Equation 12. In some embodiments, the quantizer Q used for quantizing the current coefficient is decided as shown in Equation 13. In some embodiments, the quantizer Q used for reconstruction depends on the current state index (currID) and the next state index (nextID).

In some embodiments, a lookup table is used to assign quantizers reconstruct the current coefficient based on currID and nextID. For example, one or more lookup tables are predefined and shared with all or a part of the coefficients. In another example, the lookup table(s) are signaled in the bitstream (e.g., at a block-level or high-level syntax). In some embodiments, the transition direction to the next state is determined according to k and b. In some embodiments, the transition direction to the next state is determined according to the value of k and b as shown in Equation 14. In some embodiments, the transition direction to the next state is determined according to the value of k mod b as shown in Equation 15. In some embodiments, the transition direction to the next state is determined according to b number of ranges that k can fall into. For example, for a 4-state machine with four branches originated from each state, the nextID may be determined as shown in Equation 16.

In some embodiments, the transition direction to the next state is determined according to k, b, and the current state index currID. For example, the function $f(\bullet)$ in Equation 14 may depend on currID so that the transition direction to the next state is determined as shown in Equation 17. In some embodiments, the predefined ranges in Equation 16 depend on the currID. In some embodiments, a lookup table is used to map the nextID from currID and $f(k, x)$. For example, FIG. 4F shows an example 4-state machine with four branches originated from each state. In this example, the transition direction to the next state nextID is decided based on the value of k % 4, where '%' denotes the mod operator. An example of the transition direction assignment lookup table is shown in Table 2.

In some embodiments, at the encoder side, the quantizer used for a transform coefficient is assigned to each state transition branch according to its reconstruction result. In some embodiments, the quantizer is assigned to each state transition branch according to the distance (e.g., sum of absolute differences) between different possible reconstruction values. In some embodiments, the quantizer is assigned to each state transition branch to ensure the maximum distance (e.g., sum of absolute differences) of the reconstruction values jointing at the same state. For example, an 8-state machine with two branches jointing at the same state may be implemented. As shown in FIG. 4H, four quantizers ($Q_0$, $Q_1$, $Q_2$, $Q_3$) are used to generate eight candidates ($l_0$, $l_1$, . . . , $l_7$) for one coefficient with eight different reconstruction values $$(t'_0, t'_1, \ldots , t'_7),$$

respectively. In this example, to ensure the maximum distance between the reconstruction values jointing at the same state, the candidate pairs at the same state should be ($l_0$, $l_4$), ($l_1$, $l_5$), ($l_2$, $l_6$), ($l_3$, $l_7$), An example of the quantizer assignment is illustrated in FIG. 4I.

In some embodiments, the quantizer is assigned to each state transition branch to ensure the minimum distance (e.g., sum of absolute differences) of the reconstruction values jointing at the same state.

FIG. 5B is a flow diagram illustrating a method 550 of encoding video in accordance with some embodiments. The method 550 may be performed at a computing system (e.g., the server system 112, the source device 102, or the electronic device 120) having control circuitry and memory storing instructions for execution by the control circuitry. In some embodiments, the method 550 is performed by executing instructions stored in the memory (e.g., the memory 314) of the computing system.

The system receives (552) video data (e.g., a source video sequence) comprising a plurality of blocks (e.g., corresponding to a set of pictures). The system determines (554) a quantized level for a transform coefficient of a plurality of transform coefficients. The system selects (556) a quantizer from a set of three or more quantizers based on the quantized level. The system derives (558), using the selected quantizer, a quantized transform coefficient for a first transform coefficient of the plurality of transform coefficients. The system signals (560) the quantized transform coefficient in a video bitstream. As described previously, the encoding process may mirror the decoding processes described herein (e.g., quantization and de-quantization). For brevity, those details are not repeated here.

Although FIGS. 5A and 5B illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments:

(A1) In one aspect, some embodiments include a method (e.g., the method 500) of video decoding. In some embodiments, the method is performed at a computing system (e.g., the server system 112) having memory and one or more processors. In some embodiments, the method is performed at a coding module (e.g., the coding module 320). The method includes: (i) receiving a video bitstream (e.g., a coded video sequence) comprising a plurality of coded blocks (e.g., corresponding to a plurality of pictures) and a plurality of quantized transform coefficients (e.g., corresponding to the plurality of coded blocks); (ii) determining a quantized level for a quantized transform coefficient of the plurality of quantized transform coefficients; (iii) selecting a quantizer from a set of three or more quantizers based on the quantized level; (iv) deriving, using the selected quantizer, a dequantized transform coefficient for a first quantized transform coefficient of the plurality of quantized transform coefficients; and (v) reconstructing a first block using the dequantized transform value. For example, multiple quantizers (e.g., 3 or more quantizers) may be used during a quantization process. For an N-quantizer quantization process, given a received quantized level k, its reconstruction value t' is calculated by one of the N different quantizers. The switching between different quantizers can be implemented based on an M-state machine. The rule of quantizer usage, and the state transition directions of the M-state machine may be determined according to some predefined criteria based on information available at a decoder and/or signaled in the bitstream for the whole sequence, picture, slice, tile, block, or other segment.

(A2) In some embodiments of A1, the quantizer is selected based on coded information. For example, given a received quantized level k with N quantizers $(Q_0, Q_1, \ldots, Q_{N-1})$, its reconstruction value of the n-th quantizer $$t'_n$$

is calculated as shown in Equation 8 using existing information at the coding component (e.g., a decoder component). For example, the coded information may include information about the current block (e.g., a block size and/or a prediction mode), transform information (e.g., transform kernel, transform type, and/or a magnitude of a transform coefficient), information about previously decoded blocks (e.g., neighbor blocks and/or co-located blocks of a different color component).

(A3) In some embodiments of A1, the quantizer is selected in accordance with a syntax element signaled in the video bitstream. For example, given a received quantized level k with N quantizers $(Q_0, Q_1, \ldots, Q_{N-1})$, its reconstruction value of the n-th quantizer $$t'_n$$

is calculated as shown in Equation 8 using information signaled in the video bitstream (e.g., signaled for each coefficient, each transform block, or other coding level).

(A4) In some embodiments of any of A1-A3, reconstruction values for the quantized level corresponding to respective quantizers of the set of three or more quantizers are uniformly distributed. For example, the reconstruction values of k using different quantizers are uniformly distributed. For example, the reconstruction value of k using quantizer $Q_n$ is calculated as shown in Equation 9. In a particular example with 4 quantizers, the reconstruction value of k using quantizer $Q_n$ is calculated as shown in Equation 10. An example of reconstruction values that are uniformly distributed is shown in FIG. 4E.

(A5) In some embodiments of any of A1-A3, reconstruction values for the quantized level corresponding to respective quantizers of the set of three or more quantizers are non-uniformly distributed. For example, the reconstruction values of k using different quantizers are not uniformly distributed. As an example, the reconstruction value of k using quantizer $Q_n$ is calculated as shown in Equation 11. In some embodiments, the quantization step size is based on a transform coefficient magnitude (e.g., the quantization step size increases with increasing coefficient magnitude).

(A6) In some embodiments of A5, one or more parameters for determining a reconstruction value are signaled in the video bitstream. For example, one or more parameters of Equation 11 are predefined or signaled in the video bitstream (e.g., at a sequence, picture, slice, tile, or block level). In some embodiments, a parameter (e.g., a subset of the one or more parameters) is predefined.

(A7) In some embodiments of any of A1-A6, the quantizer is selected using a state machine. For example, an m-state machine is used for switching between n different quantizers $(Q_0, Q_1, \ldots, Q_{n-1})$. The quantizer used for the reconstruction is decided based on the current status of the m-state machine. As an example, for a m-state machine, the transition from one state to another is determined based on the received quantized level k, the number of branches b originated from the current state, and/or the current state index.

(A8) In some embodiments of A7, the quantizer is selected based on a current state index. For example, the quantizer Q used for reconstruction depends on the current state index (currID). As an example, the quantizer Q assigned to quantize the current coefficient is decided as Q=QcurID.

(A9) In some embodiments of A8, the current state index is expressed relative a number of states in the state machine. For example, the quantizer Q used for quantizing the current coefficient is decided as $Q=Q_{m-1-currID}$.

(A10) In some embodiments of any of A7-A9, the quantizer is selected based on a next state index. For example, the quantizer Q used for reconstruction depends on the current state index (currID) and the next state index (nextID).

(A11) In some embodiments of any of A7-A10, the quantizer is selected using a lookup table for the state machine. For example, a lookup table is used to assign quantizers reconstruct the current coefficient based on currID and nextID.

(A12) In some embodiments of A11, the lookup table is predefined. For example, one or several the lookup table(s) is predefined and shared with all or a part of the coefficients.

(A13) In some embodiments of A11, the lookup table is signaled in the video bitstream. For example, the lookup table(s) is signaled in the bitstream for the whole sequence, picture, slice, tile, block, and etc.

(A14) In some embodiments of any of A7-A13, a transition to a next state in the state machine is determined based on a quantized level and a number of branches originating from a current state in the state machine. For example, the transition direction to the next state is determined according to k and b. As a specific example, the transition direction to the next state is determined according to the value of k and b as shown in Equation 14.

(A15) In some embodiments of A14, the transition is determined using a mod function. For example, the transition direction to the next state is determined according to the value of k mod b, as shown in Equation 15.

(A16) In some embodiments of A14 or A15, the transition is determined based on which range of a plurality of ranges the quantized level is within. For example, the transition direction to the next state is determined according to b number of ranges that k can fall into. In a specific example, for a 4-state machine with four branches originating from each state, the nextID is determined as shown in Equation 16.

(A17) In some embodiments of A16, the plurality of ranges are based on a current state index. For example, the predefined ranges in Equation 16 may be based on the current state index.

(A18) In some embodiments of any of A14-A17, the transition is further based on a current state index. For example, the transition direction to the next state is determined according to k, b, and the current state index currID. For example, the transition is determined as shown in Equation 17. In some embodiments, a lookup table is used to determine the transition using the current state index, the quantized level, and the number of branches originating from the current state. As a specific example, for a 4-state machine with four branches originated from each state in FIG. 4F. The transition direction to the next state nextID is decided based on the value of k % 4, where '%' denotes the mod operator. An example of a transition direction assignment lookup table is shown in Table 2. As another specific example, an 8-state machine may be used (e.g., as shown in FIG. 4G) where there are four branches originating from each state. The transition direction to the next state nextID may be decided based on the value of k % 4 as shown in Table 3.

(B1) In another aspect, some embodiments include a method (e.g., the method 550) of video encoding. In some embodiments, the method is performed at a computing system (e.g., the server system 112) having memory and one or more processors. In some embodiments, the method is performed at a coding module (e.g., the coding module 320). The method includes: (i) receiving video data (e.g., a source video sequence) comprising a plurality of blocks (e.g., corresponding to a plurality of pictures); (ii) determining a quantized level for a transform coefficient of the plurality of transform coefficients; (iii) selecting a quantizer from a set of three or more quantizers based on the quantized level; (iv) deriving, using the selected quantizer, a quantized transform coefficient for a first transform coefficient of the plurality of transform coefficients; and (v) signaling the quantized transform value in a video bitstream.

(C1) In another aspect, some embodiments include a method of video encoding. In some embodiments, the method is performed at a computing system (e.g., the server system 112) having memory and one or more processors. In some embodiments, the method is performed at a coding module (e.g., the coding module 320). The method includes: (i) receiving video data (e.g., a source video sequence) comprising a plurality of blocks (e.g., corresponding to a plurality of pictures); (ii) assigning each quantizer of a set of three or more quantizers to respective state transition branches of a state machine; (iii) selecting a quantizer from the set of three or more quantizers; (iv) deriving, using the selected quantizer, a quantized transform coefficient for a first transform coefficient of a plurality of transform coefficients; and (v) signaling the quantized transform value in a video bitstream. For example, at the encoder side, the quantizer used for a transform coefficient is assigned to each state transition branch according to its reconstruction result.

(C2) In some embodiments of C1, each quantizer from the set of three or more quantizers is assigned according to distance between different potential reconstruction values. For example, the quantizer is assigned to each state transition branch according to the distance (e.g., SAD, SATD, or SSE) between different possible reconstruction values.

(C3) In some embodiments of C2, each quantizer of the set of three or more quantizers is assigned so as to maximize a distance between potential reconstruction values originating from a same state. For example, the quantizer is assigned to each state transition branch to ensure the maximum distance (e.g., SAD, SATD, or SSE) of the reconstruction values jointing at the same state. As a specific example, an 8-state machine with two branches jointing at the same state is implemented. As shown in FIG. 4H, four quantizers ($Q_0$, $Q_1$, $Q_2$, $Q_3$) are used to generate eight candidates ($l_0$, $l_1$, . . . , $l_7$) for one coefficient with eight different reconstruction values $$(t'_0, t'_1, \ldots, t'_7),$$

respectively. In this example, to ensure the maximum distance between the reconstruction values jointing at the same state, the candidate pairs at the same state should be ($l_0$, $l_4$), ($l_1$, $l_5$), ($l_2$, $l_6$), ($l_3$, $l_7$), An example of the quantizer assignment is illustrated in FIG. 4I.

(C4) In some embodiments of C2, each quantizer of the set of three or more quantizers is assigned so as to minimize a distance between potential reconstruction values originating from a same state. For example, the quantizer is assigned to each state transition branch to ensure the minimum distance (e.g., SAD, SATD, or SSE) of the reconstruction values jointing at the same state.

(D1) In another aspect, some embodiments include a method of processing visual media data. In some embodiments, the method is performed at a computing system (e.g., the server system 112) having memory and one or more processors. In some embodiments, the method is performed at a coding module (e.g., the coding module 320). The method includes: (i) obtaining a source video sequence that comprises a plurality of frames; and (ii) performing a conversion between the source video sequence and a video bitstream of visual media data according to a format rule, where the video bitstream comprises a plurality of quantized transform coefficients and a plurality of blocks that includes a current block and the format rule specifies that: (a) a quantized level is to be determined for a quantized transform coefficient of the plurality of quantized transform coefficients; (b) a quantizer is to be selected from a set of three or more quantizers based on the quantized level; (c) a dequantized transform coefficient is to be derived, using the selected quantizer, for a first quantized transform coefficient of the plurality of quantized transform coefficients; and (d) a first block is to be reconstructed using the dequantized transform value.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A18, B1, C1-C4, and D1 above). In yet another aspect, some embodiments include a non-transitory computer-readable storage medium storing one or more sets of instructions for execution by control circuitry of a computing system, the one or more sets of instructions including instructions for performing any of the methods described herein (e.g., A1-A18, B1, C1-C4, and D1 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video param- eter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this speci- fication, specify the presence of stated features, integers, steps, operations, elements, and/or components, but do not preclude the presence or addition of one or more other features, integers, steps, operations, elements, components, and/or groups thereof. As used herein, N refers to a variable number. Unless explicitly stated, different instances of N may refer to the same number (e.g., the same integer value, such as the number 2) or different numbers.

As used herein, the term "if" can be construed to mean "when" or "upon" or "in response to determining" or "in accordance with a determination" or "in response to detect- ing" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determi- nation" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving a video bitstream comprising a plurality of blocks and a plurality of quantized transform coeffi- cients;

determining a quantized level for a quantized transform coefficient of the plurality of quantized transform coef- ficients;

selecting a quantizer from a set of three or more quan- tizers based on the quantized level using a state machine having more than four states, wherein the state machine includes four branches originating from each state, and wherein a transition direction to a next state is determined based on a mod function of the quantized level;

deriving, using the quantizer, a dequantized transform coefficient for a first quantized transform coefficient of the plurality of quantized transform coefficients; and reconstructing a first block using the dequantized trans- form value.

2. The method of claim 1, wherein the quantizer is selected based on coded information.

3. The method of claim 1, wherein the quantizer is selected in accordance with a syntax element signaled in the video bitstream.

4. The method of claim 1, wherein reconstruction values for the quantized level corresponding to respective quantiz- ers of the set of three or more quantizers are uniformly distributed.

5. The method of claim 1, wherein reconstruction values for the quantized level corresponding to respective quantiz- ers of the set of three or more quantizers are non-uniformly distributed.

6. The method of claim 5, wherein one or more param- eters for determining a reconstruction value are signaled in the video bitstream.

7. The method of claim 1, wherein the quantizer is selected based on a current state index.

8. The method of claim 7, wherein the current state index is expressed relative to a number of states in the state machine.

9. The method of claim 1, wherein the quantizer is selected based on a next state index.

10. The method of claim 1, wherein the quantizer is selected using a lookup table for the state machine.

11. The method of claim 10, wherein the lookup table is predefined.

12. The method of claim 10, wherein the lookup table is signaled in the video bitstream.

13. The method of claim 1, wherein a transition is determined based on which range of a plurality of ranges the quantized level is within.

14. The method of claim 13, wherein the plurality of ranges are based on a current state index.

15. The method of claim 13, wherein the transition is further based on a current state index.

16. A method of video encoding performed at a computing system having memory and one or more processors, the method comprising:

receiving video data comprising a plurality of blocks;

determining a quantized level for a transform coefficient of a plurality of transform coefficients;

selecting a quantizer from a set of three or more quan- tizers based on the quantized level using a state machine having more than four states, wherein the state machine includes four branches originating from each state, and wherein a transition direction to a next state is determined based on a mod function of the quantized level;

deriving, using the selected quantizer, a quantized transform coefficient for a first transform coefficient of the plurality of transform coefficients; and signaling the quantized transform coefficient in a video bitstream.

17. A non-transitory computer-readable storage medium storing one or more instructions and a video bitstream that is generated by a video encoding method, the one or more instructions when executed by a processor, cause a computing system to perform the video encoding method, the video encoding method comprising:

receiving video data comprising a plurality of blocks;

determining a quantized level for a transform coefficient of a plurality of transform coefficients;

selecting a quantizer from a set of three or more quantizers based on the quantized level using a state machine having more than four states, wherein the state machine includes four branches originating from each state, and wherein a transition direction to a next state is determined based on a mod function of the quantized level;

deriving, using the selected quantizer, a quantized transform coefficient for a first transform coefficient of the plurality of transform coefficients; and signaling the quantized transform coefficient in the video bitstream.

18. The method of claim 1, wherein the state machine is an 8-state machine.

19. The method of claim 1, wherein each quantizer of the set of three or more quantizers is assigned to a respective state transition branch to maximize a distance between reconstruction values joining at a same state.

20. The method of claim 1, wherein transform coefficients are reconstructed in a scanning order corresponding to an entropy decoding order.

* * * * *